United States Patent
Hayes et al.

(10) Patent No.: US 9,739,195 B2
(45) Date of Patent: Aug. 22, 2017

(54) ENHANCED CHARGE AIR COOLER

(71) Applicant: Ford Global Technologies, LLC, Dearborn, MI (US)

(72) Inventors: Kenneth J. Hayes, Northville Township, MI (US); Jim Tyler, Livonia, MI (US); Yan Pan, Livonia, MI (US); Garrett Michael O'Donohue, Livonia, MI (US); Saulo Da Cortes Cervantes, Tlalnepantla de baz (MX)

(73) Assignee: Ford Global Technologies, LLC, Dearborn, MI (US)

( * ) Notice: Subject to any disclaimer, the term of this patent is extended or adjusted under 35 U.S.C. 154(b) by 366 days.

(21) Appl. No.: 14/500,776

(22) Filed: Sep. 29, 2014

(65) Prior Publication Data
US 2016/0090899 A1    Mar. 31, 2016

(51) Int. Cl.
*B60K 11/04*    (2006.01)
*F02B 29/04*    (2006.01)

(52) U.S. Cl.
CPC ............ *F02B 29/045* (2013.01); *B60K 11/04* (2013.01); *F02B 29/0431* (2013.01); *F28F 2280/00* (2013.01); *Y02T 10/146* (2013.01)

(58) Field of Classification Search
CPC .... B60K 11/04; F28F 2265/30; F28F 2280/00
USPC ..................... 165/67, 69, 121, 202; 180/68.4
See application file for complete search history.

(56) References Cited

U.S. PATENT DOCUMENTS

| | | | | |
|---|---|---|---|---|
| 5,341,871 A | * | 8/1994 | Stelzer | F01P 5/02 165/121 |
| 5,671,803 A | * | 9/1997 | Tepas et al. | B60K 11/04 165/122 |
| 5,791,402 A | * | 8/1998 | Dumetz | F28F 9/002 165/149 |
| 6,106,228 A | * | 8/2000 | Bartlett | F01P 7/10 123/41.11 |
| 6,783,325 B1 | | 8/2004 | Hileman et al. | |
| 6,860,323 B2 | | 3/2005 | Cheng | |
| 7,287,576 B2 | | 10/2007 | O'Brien | |
| 7,703,566 B2 | * | 4/2010 | Wilson et al. | B60K 11/04 180/295 |
| 8,128,358 B2 | * | 3/2012 | McLennan | B29C 45/14016 415/201 |
| 8,579,060 B2 | | 11/2013 | George et al. | |
| 2004/0206099 A1 | * | 10/2004 | Kim | B60H 1/3204 62/178 |

FOREIGN PATENT DOCUMENTS

EP         0546361 A1 *   6/1993

* cited by examiner

Primary Examiner — Allen Flanigan
(74) Attorney, Agent, or Firm — Greg Brown; McCoy Russell LLP

(57) ABSTRACT

A system for increasing air flow across a heat exchanger of a vehicle is described. In one particular example, the system comprises a charge-air cooler coupled via upper and lower brackets to a vehicle body, and an axial dual fan connected to the upper and lower brackets via one or more isolators. With this arrangement, the cooling system described allows for vehicle performance to be enhanced while also increasing the durability and robustness of the system and reducing the noise produced therefrom.

20 Claims, 9 Drawing Sheets

ENHANCED CHARGE AIR COOLER

FIELD

The present description relates to an engine with a charge air cooler coupled to a fan.

BACKGROUND AND SUMMARY

Electric fans increase airflows in engines, particularly when used in combination with components like heat exchangers. Thus, increased airflows increase a cooling rate to enhance vehicle performance. However, placement of the fan into the engine compartment increases the design complexity and engine assembly in a manner that depends on the size and placement of the fans since the additional component occupies volume and uses system resources. Accordingly, engine serviceability is also affected since maintenance activities may depend on dismantling numerous layered components in some instances.

A fan assembly may be included to secure the fan in place by attaching the electric fan and assembly to the side tanks of a heat exchanger. For example, U.S. Pat. No. 7,287,576 discloses a vehicle cooling system assembly with a fan. The system described includes mounting brackets protruding from a periphery of each of the fan assemblies that connect to the sides of the radiator via mounting brackets providing additional supports that also reduce noise therein. As another example, U.S. Pat. No. 6,783,325 describes an axial fan system assembly for an intercooler that includes a tray bracket outlet and inlet to provide support and a means to attach the fan unit assembly. As yet another example, U.S. Pat. No. 8,579,060 discloses a heat exchanging apparatus with a fan system that includes mounting brackets for mounting the heat exchanger and fan via side mounting. However, vehicle engines may have limited space in the engine compartment such that sufficient clearance does not exist for attaching and placing a dedicated fan along the side of a heat exchanger.

The inventors have recognized issues with such approaches and herein describe a system, comprising a charge-air cooler coupled via upper and lower brackets to a vehicle body, and an axial dual fan system connected to the upper and lower brackets via one or more isolators. In one particular example described, the axial dual fan system extends vertically to the upper brackets on a top side, and extends vertically to the lower brackets on a bottom side. That is, the axial dual fan system extends vertically to the upper brackets only on a top side, and extends vertically to the lower brackets only on a bottom side while no connections are included extending from a lateral side portion of the axial dual fan system to the upper and lower brackets. In this way, the technical result is achieved that a dedicated fan system may be placed in the engine to increase the airflow through the intercooler. Moreover, the vibrational energy transferred to the axial dual fan system from the vehicle may be reduced during operation, which reduces the noise emanating therefrom.

Additional advantages of the system are realized by the arrangement of the engine components relative to one another, which simplifies the manufacturing assembly sequence, and also increases serviceability, and in particular, simplifies servicing of the dual fan system. Features like a perforated housing further allow for increased airflow to enhance vehicle performance in some conditions, while a scaffolding structure of the housing increases rigidity to increase the durability and system robustness. Such features serve to increase the useful lifetime of the system.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

Figure 1:
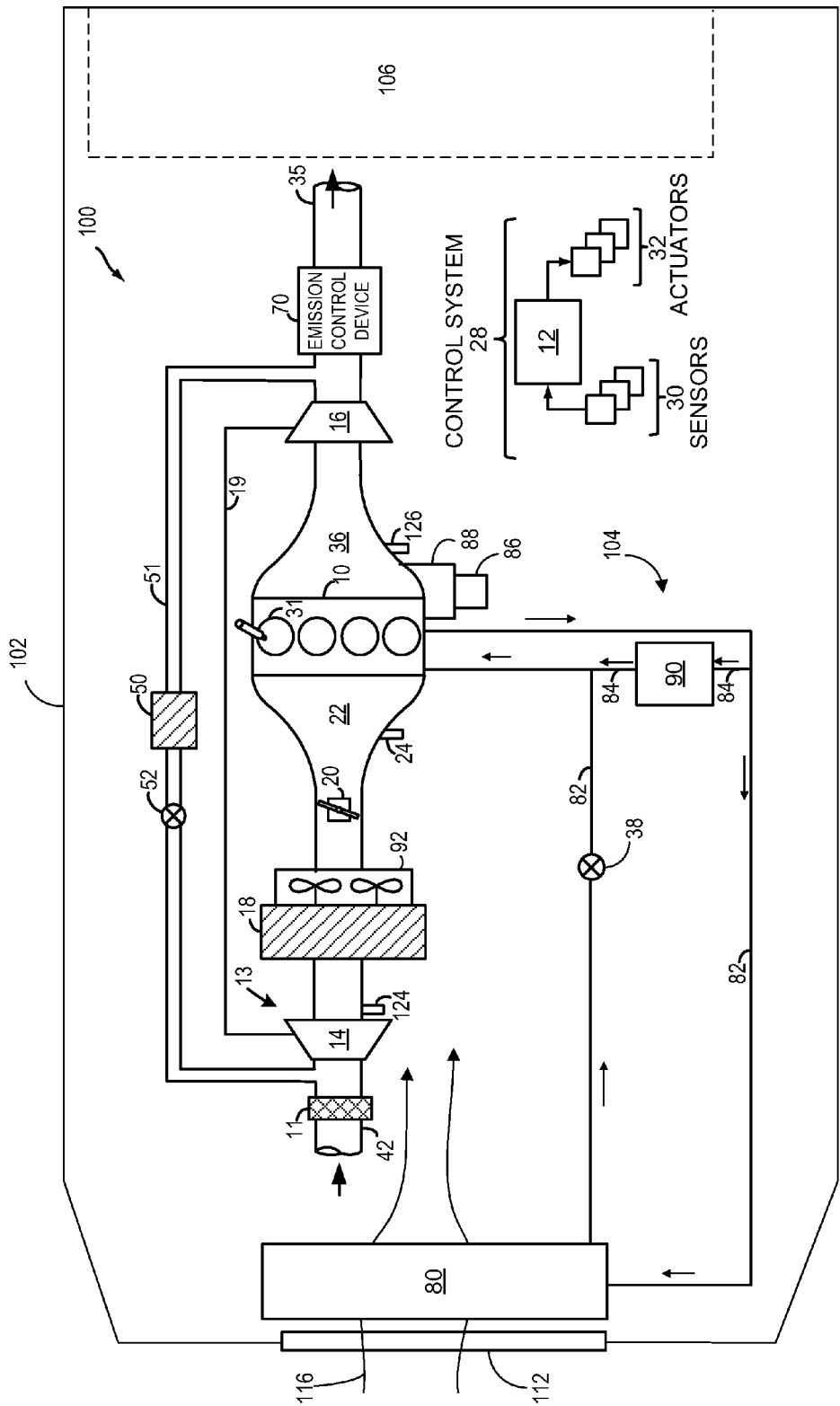
FIG. 1 shows a schematic engine diagram including a charge air cooler and dual fan system according to the present disclosure.

The embodiments of the present disclosure and various features and advantageous details thereof are explained with reference to the non-limiting embodiments. Some of the examples that are described and/or illustrated in the accompanying drawings and detailed in the following description are drawn approximately to scale, however other relative dimensions and/or ratios may also be used, if desired. For example, exemplary scale drawings are provided in FIGS. 2-8B to illustrate various features of the described system. The examples provided herein are intended merely to facilitate an understanding of ways in which the disclosure may be implemented in practice while enabling those of skill in the art to practice the disclosed embodiments. Accordingly, like reference numerals represent similar parts throughout the several views of the drawings.

DETAILED DESCRIPTION

Figure 2:
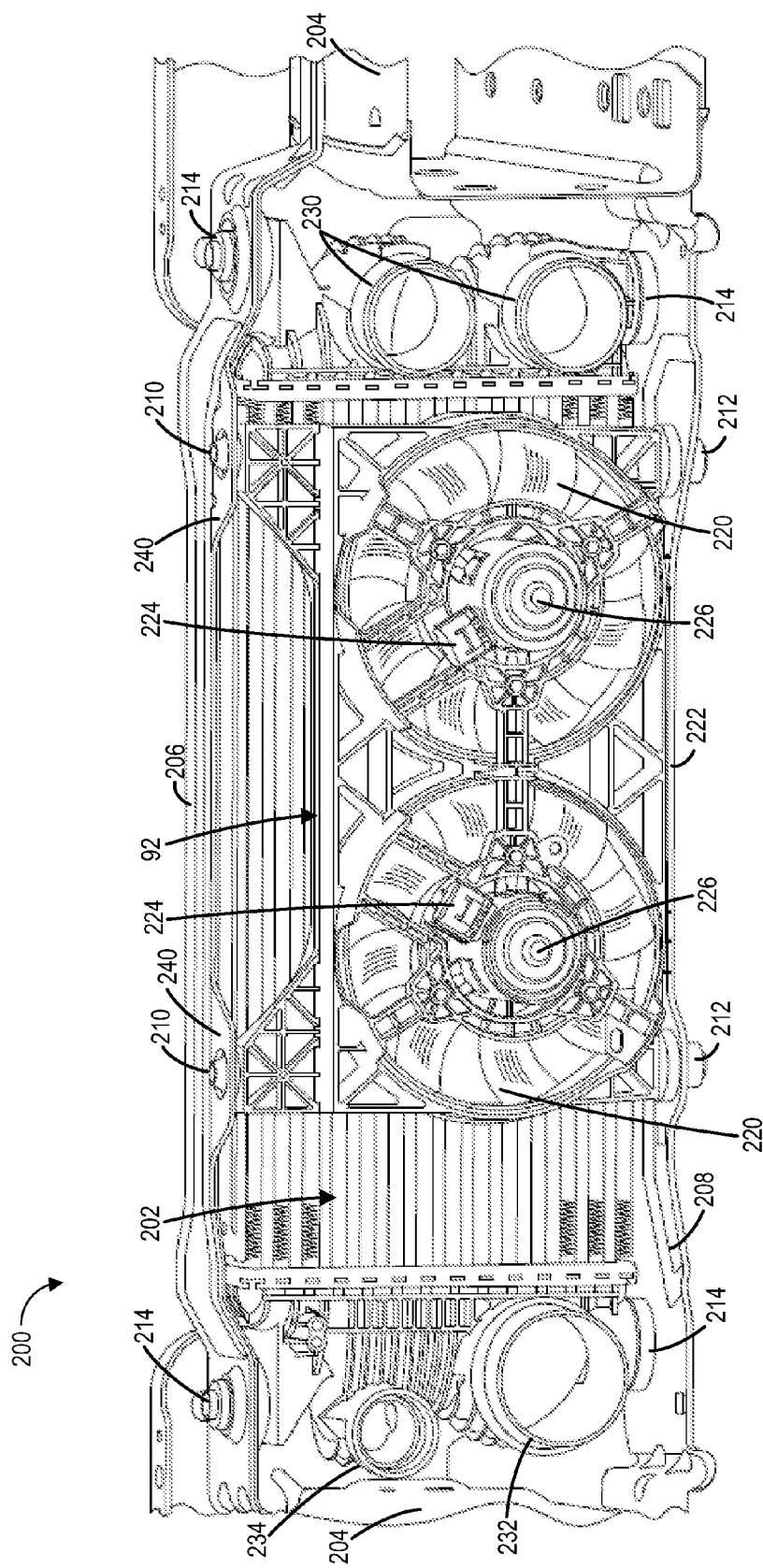
FIG. 2 illustrates an example charge air cooler and fan assembly from a back view.
Figure 3:
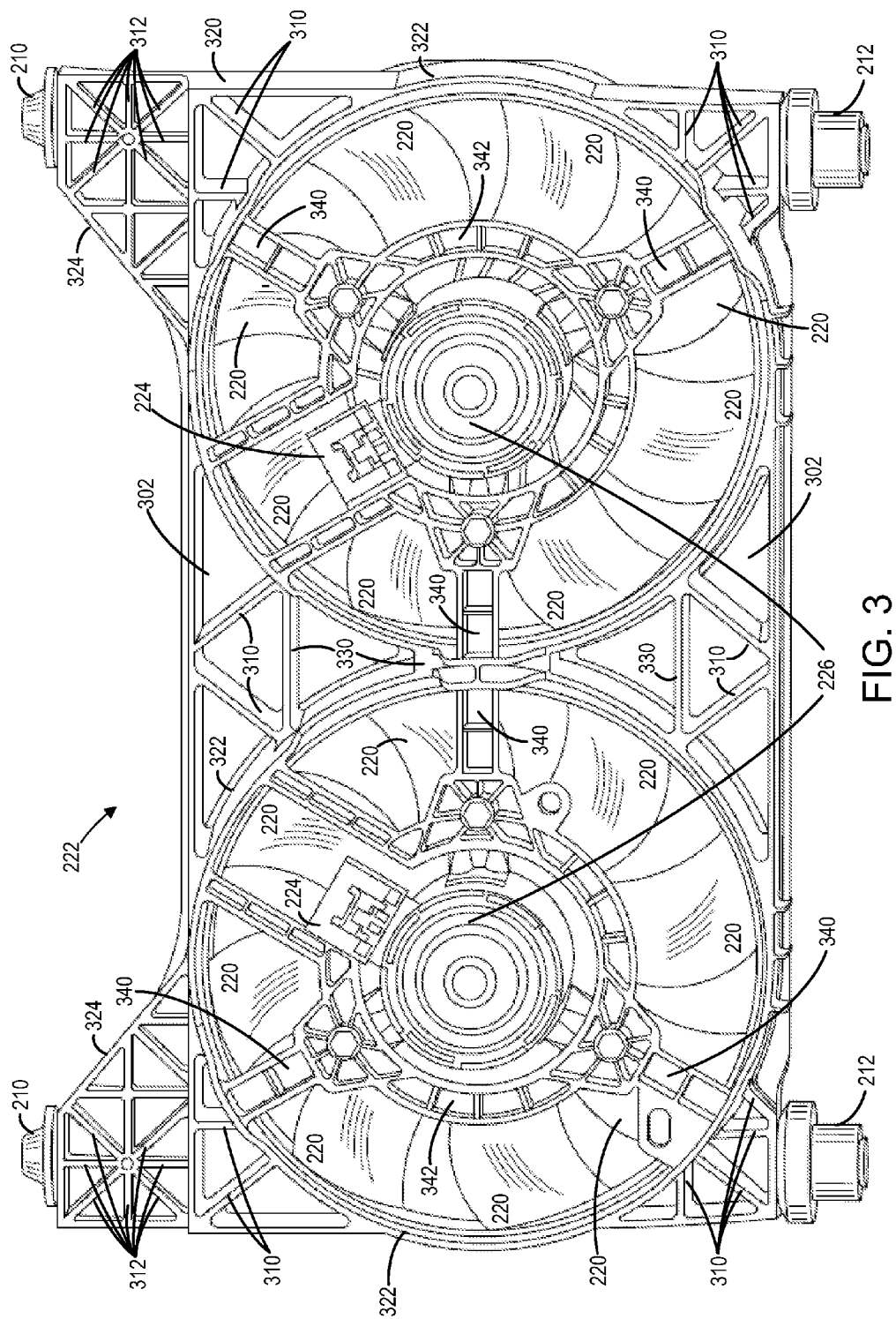
FIG. 3 shows a view of the example axial dual fan system from behind.
Figure 4:
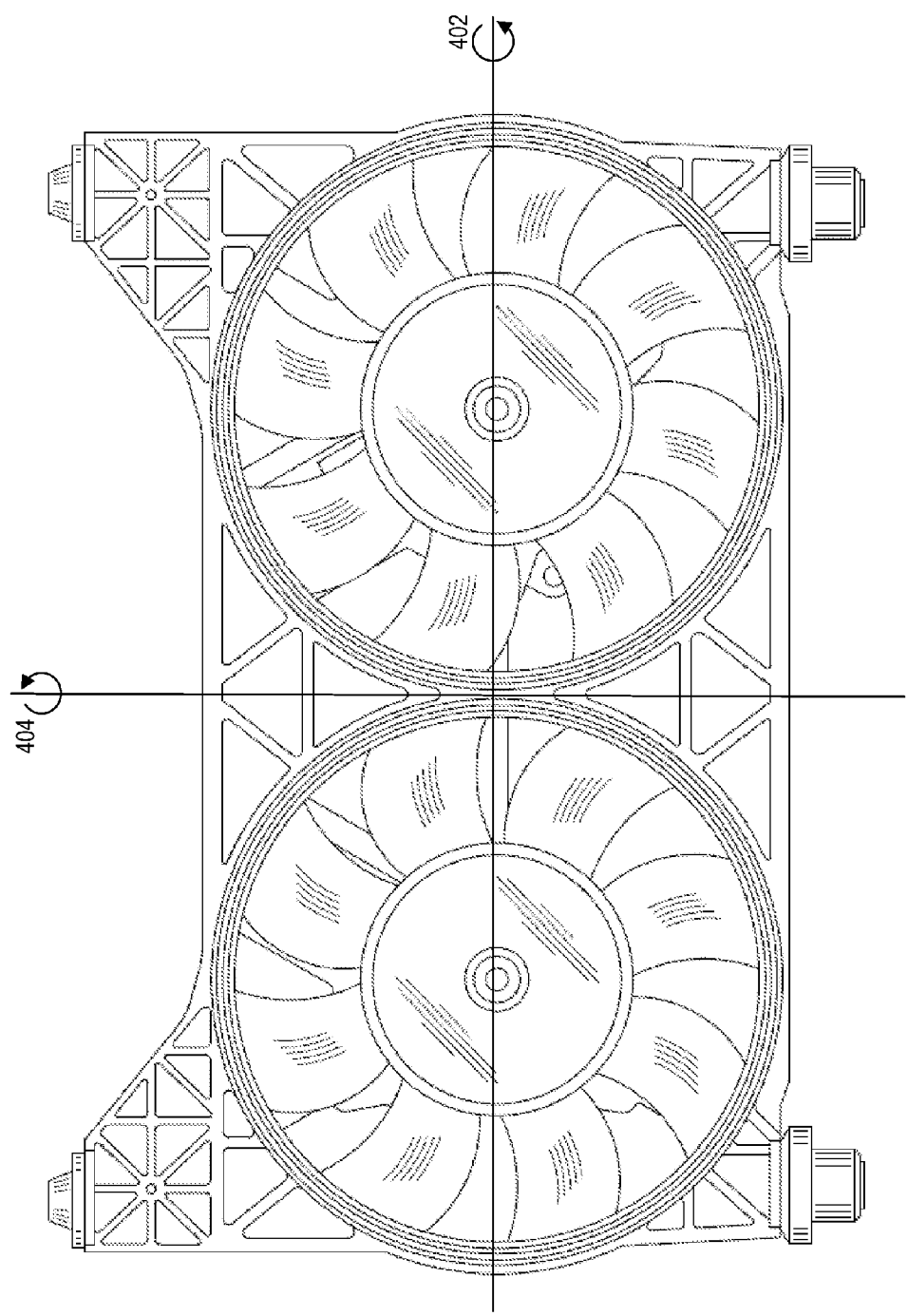
FIG. 4 shows a view of the example axial dual fan system from the front.
Figure 5:
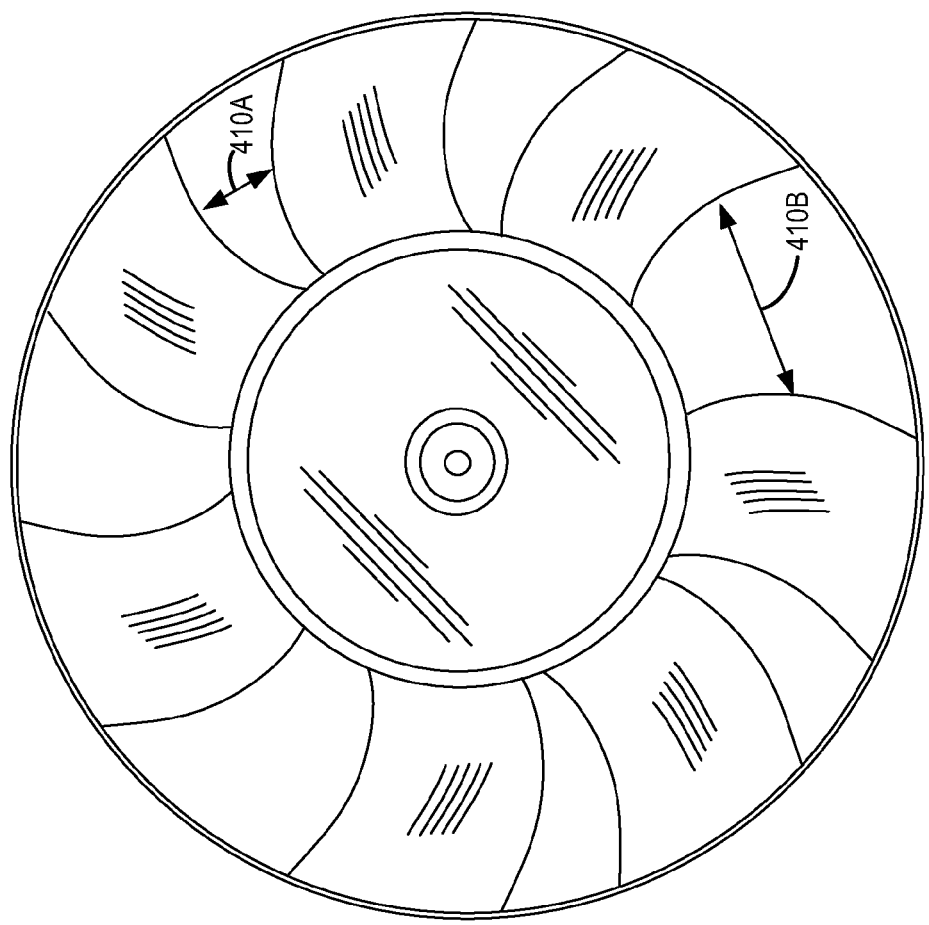
FIG. 5 shows an example fan with an asymmetric blade arrangement.

The system described may increase airflow through an intercooler to enhance vehicle performance, particularly at low vehicle speeds and high engine loads. For this reason, FIG. 1 shows a schematic engine diagram according to the present disclosure. Then, FIG. 2 illustrates the example charge-air cooler and fan assembly from a back view. FIGS. 3 and 4 show perspective views of the axial dual fan system in greater detail while FIG. 5 shows an example asymmetric blade arrangement. Example components for mounting the fan system according to the present disclosure are further illustrated in FIGS. 6-8B while an example method for operating the fans based on an engine load is presented in FIG. 9.

FIG. 1 shows an example embodiment of engine system 100 in a motor vehicle 102, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

In the embodiment depicted, engine 100 is a boosted engine coupled to a turbocharger 13 including a compressor 14 driven by a turbine 16. Specifically, fresh air is introduced along intake passage 42 into engine 100 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge-air cooler (CAC) 18 to throttle valve 20. The CAC that is coupled to axial dual fan system 92 may be an air-to-air or air-to-water heat exchanger, for example. Throttle valve 20 is coupled to engine intake manifold 22. From the compressor, the hot compressed air charge enters the inlet of the CAC 18, cools as it travels through the CAC, and then exits to pass through the throttle valve to the intake manifold. Ambient air flow 116 from outside the vehicle may enter engine 100 through a grille 112 at a vehicle front end and pass across the CAC, to aid in cooling the charge air. Condensate may form and accumulate in the CAC when the ambient air temperature decreases, or during humid or rainy weather conditions, where the charge air is cooled below the water dew point.

In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 31 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve may be opened to admit a controlled amount of cooled exhaust gas to the compressor inlet for desirable combustion and emissions-control performance. In this way, engine system 100 is adapted to provide external, low-pressure (LP) EGR. However, other arrangements are possible and in other examples, engine system 100 may alternatively be adapted to provide high-pressure (HP) EGR.

Motor vehicle 102 further includes a cooling system 104 that circulates coolant through internal combustion engine 100 to absorb waste heat and distribute the heated coolant to radiator 80 and/or heater core 90 via coolant lines 82 and 84, respectively. In particular, FIG. 1 shows cooling system 104 coupled to engine 100 and circulating engine coolant from engine 100 to radiator 80 via engine-driven water pump 86, and back to engine 100 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIG. 1, is directly proportional to engine speed. In another example, a motor-controlled pump may be used that can be adjusted independently of engine rotation. The temperature of the coolant may be regulated by a thermostat valve 38, located in the cooling line 82, which may be kept closed until the coolant reaches a threshold temperature.

Engine system 100 includes an axial dual fan system 92 with two electric fans for directing cooling airflow toward CAC 18, engine cooling system 104, and/or other engine system components. In some embodiments, axial dual fan system 92 may be an engine cooling fan. The engine cooling fan may be coupled to a heat-exchanger, such as charge-air cooler 18, in some instances, or may be coupled to a heat-exchanger like a radiator in other instances in order to maintain airflow through the heat-exchanger when vehicle 102 is moving slowly or stopped while the engine is running. Fan engagement and rotation speed or direction may be controlled by a controller 12 described in more detail hereafter. In one example described herein, the axial dual fan system directs cooling airflow toward CAC 18. Alternatively, axial dual fan system 92 may be coupled to the engine accessory drive system, and driven by the engine crankshaft. In other embodiments, axial dual fan system 92 may act as a dedicated CAC fan. With this arrangement, the axial dual fan system may be coupled to the CAC or placed in a location to direct airflow directly toward the CAC. In yet another embodiment, the two or more electric fans may be controlled separately (e.g., at different rotational speeds) to provide differential cooling within the engine system.

Coolant may flow through coolant line 82, as described above, and/or through coolant line 84 to heater core 90 where the heat may be transferred to passenger compartment 106, and the coolant flows back to engine 100. In some examples, engine-driven water pump 86 may operate to circulate the coolant through both coolant lines 82 and 84.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input, brake input, transmission selector position, vehicle speed, engine speed, mass airflow through the engine, boost pressure, ambient temperature, ambient humidity, throttle inlet pressure, manifold charge temperature, intake air temperature, fan speed, etc.), cooling system sensors (such as coolant temperature, fan speed, passenger compartment temperature, ambient humidity, etc.), CAC 18 sensors (such as CAC inlet air temperature and pressure, CAC outlet air temperature and pressure, etc.), and others.

Furthermore, controller 12 may communicate with various actuators 32, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing methods based on the system described below as well as other variants that are anticipated but not specifically listed.

Motor vehicle 102 further includes a grille 112 providing an opening (e.g., a grille opening, a bumper opening, etc.) for receiving ambient air flow 116 through or near the front end of the vehicle and into the engine compartment. Such ambient air flow 116 may then be utilized by heat-exchanger 80, axial dual fan system 92, and other components to keep the engine and/or transmission cool. Further, the ambient air flow 116 may reject heat from the vehicle air conditioning system and can improve performance of turbo-charged/super-charged engines that are equipped with CAC 18 that reduces the temperature of the air that goes into the intake manifold/engine. The axial dual fan system 92 may be adjusted to further increase or decrease the air flow. Furthermore, a dedicated CAC fan may be included in the engine system and used to increase or decrease air flow to the CAC. Other under hood components (fuel system, batteries, etc.) may benefit from the cooling air flow as well.

Axial dual fan system 92 may be used to increase or decrease cooling ambient air flow 116 to one or more engine components. For example, by increasing the electric fan rotation speed, the amount and rate of air flow to the engine increases. Conversely, by decreasing the fan rotation speed, the rate of air flow decreases. In another example, the electric fan may be turned on at a low rotation speed to decrease CAC efficiency and increase CAC outlet temperature. Specifically, at low speeds, the electric fan may not be effective in cooling. However, the blades of the fan may act to resist airflow to the radiator and CAC. In this way, ambient air flow velocities directly affect CAC effectiveness and CAC outlet temperature. Thus, by changing fan rotation speed, CAC efficiency and outlet temperature may be altered. In addition to controlling rotation speed, the electric fan may also change rotation direction. The blades of the fan may be designed such that rotation in a first direction directs air flow toward engine components. In the following descriptions, this will serve as the normal or base direction for fan operation. Rotation of the fan blades in a second direction, opposite the first direction, may direct air flow away from engine components. In this way, fan rotation direction may also be used to alter the cooling air flow reaching engine components and, subsequently, CAC efficiency and outlet temperature.

In some embodiments, control system 28 may be configured to adjust operation of axial dual fan system 92 responsive to vehicle operating conditions. Axial dual fan system 92 operation may include increasing the fan rotation speed, decreasing the fan rotation speed, stopping the fan rotation, reversing the fan rotation direction, adjusting rotation on/off timing, etc. As an example, controller 12 may be communicably connected to axial dual fan system 92, and may have instructions stored thereon to adjust the rotation of the electric fans. For example, each fan of the dual fan system may be engaged for operation at a single speed responsive to a temperature above a threshold (e.g., greater 100° C.) in some instances as described herein for simplicity. In this way, the axial dual fan system is operated at a single speed, wherein each fan rotates, or is run, at the single speed. Engagement of the dual fans allows extra airflow through the intercooler to enhance vehicle performance, particularly at low vehicle speeds and high engine loads.

Electric fan operation may be adjusted in response to a variety of system variables, including engine temperatures, vehicle driving conditions, charge air temperature at the CAC outlet (CAC outlet temperature), and outside weather conditions. Condensate formation in the CAC may include an amount of condensate and/or a condensate formation rate, where CAC outlet temperature may be one of several variables used to estimate and/or calculate condensate formation. Operation of the electric fans may be in response to one of these system variables, even if other variables remain within a normal range. In this way, all variables may be assessed to determine the optimal electric fan rotation speed or direction for vehicle cooling, CAC corrosion prevention, misfire prevention, and increased fuel economy.

Turning to a description of the system, FIG. 2 schematically illustrates the example charge-air cooler and fan assembly from a back view to show how the components are arranged relative to one another within the engine compartment. Specifically, FIG. 2 shows a view from behind the axial dual fan system.

System 200 comprises charge-air cooler 202 coupled to vehicle body 204 via upper bracket 206 and lower bracket 208. The upper and lower brackets are configured to connect to both charge-air cooler 202 and axial dual fan system 92. In this way, upper bracket 206 and lower bracket 208 are designed to simplify assembly operations during manufacturing while also reducing the vibrational energy (e.g., from a vehicle operation or road load) transferred to engine components (e.g., axial dual fan system 92) during operation, particularly since a coupling connection to the vehicle frame is made via the upper and lower brackets. Additional reduction of the energy transferred is achieved by connecting the axial dual fan system 92 to the upper and lower brackets via one or more isolators 210 and 212, respectively. Although in some embodiments a single set of isolators may connect the axial dual fan system 92 to upper bracket 206 and lower bracket 208, as described herein, a different set of isolators may be used for attachment to each bracket. That is, axial dual fan system 92 may connect to upper bracket 206 via a first set of isolators 210 while the connection to lower bracket 208 is made via a second set of isolators 212 that are different from the first set of isolators. In still other embodiments, different isolators may be used for each connection while a different number of connections may be made to each bracket. A third set of isolators 214 are included for connecting charge-air cooler 202 to the upper and lower brackets. For simplicity, the third set of isolators 214 are described as single type herein.

As shown in FIG. 2, a width of the axial dual fan system in a lateral direction is smaller than a width of the charge-air cooler. With this arrangement, a lateral width of the charge-air cooler is greater than a lateral width of the dual fan system housing such that an end portion, e.g., tank, of the charge-air cooler comprising a tubular projection (e.g., CAC outlet 232) extends laterally beyond the housing, the end portion not being coupled to the fan housing. Axial dual fan system 92 includes two fans 220 shrouded by a perforated housing 222, which is referred to as an open shrouding. Perforated housing 222 extends vertically to the upper brackets on a top side, and vertically to the lower brackets on a bottom side. Vertical extension of the fan system to the upper brackets on the top side and to the lower brackets on the bottom side advantageously allows the engine components of the cooling system (e.g., CAC and dedicated fan) to be juxtaposed in the engine compartment while substantially minimizing space constraints that are otherwise present. Further, because the axial dual fan system is configured to extend vertically to the upper brackets only on a top side, and extend vertically to the lower brackets only on a bottom side, the fan system comprises no connections extending from a lateral side portion to the upper and lower brackets, which simplifies the arrangement in the engine compartment. With this arrangement, assembly ergonomics during manufacturing and/or engine servicing may also be streamlined for enhanced accessibility to engine parts. Each fan includes electrical connector 224 for coupling axial dual fan system 92 to control system 28 via fan motors 226.

As noted above, a charge-air cooler may be configured to receive hot compressed air from a compressor. For this reason, FIG. 2 depicts CAC 202 with twin turbo inlets 230 for directing the compressed air to the charge-air cooler, and CAC outlet 232 that directs the cooled airflow to engine 100, e.g., via an intake manifold such as 22. Axial dual fan system 92 may be engaged based on the vehicle operating conditions to aid in cooling the charge air while it flows through CAC 202. Blow off valve 234 allows pressure in the air induction system to be released in order to prevent compressor surge by allowing the compressed air to vent to the atmosphere (not shown). Alternatively, the released air may also be recirculated into the intake upstream of the compressor inlet (also not shown).

As indicated by FIG. 2, charge-air cooler 202 and axial dual fan system 92 have a parallel arrangement, with the axial dual fan system positioned directly behind, and adjacent to the charge-air cooler. Because the brackets attach directly to the frame of the vehicle body while being coupled to the charge-air cooler and axial dual fan system, a potential exists for energy transfer to the fan system from road loads and acceleration during vehicle use. Therefore, system 200 includes additional features to further isolate the fan system in order to reduce noises produced during operation. For example, the first and second sets of isolators, 210 and 212, respectively, may comprise a rubber material to insulate the fan system. However, other materials are possible, and in other embodiments, another material may be used so long as vibrations are absorbed as a means of isolating the dual fan system during operation. FIG. 2 shows axial dual fan system 92 extending vertically on a top side to upper bracket 206. With this arrangement, the housing of the dual fan system connects directly to the first set of isolators 210 comprising a rubber material that is further connected directly to upper bracket 206. Herein, a direct connection between two components indicates that the two components are connected to one another without any intervening components. When connected in this way, vibrational and translational energies transferred from upper bracket 206 are substantially absorbed by the rubber isolators that intervene between the housing and the upper bracket. Moreover, the design of the housing further dissipates any residual energy that may be transferred to the housing by distributing the residual energy transferred through the structural components of the perforated housing. In this way, distribution of residual vibrations act to isolate the fans since the system effectively dissipates the energy before reaching the fans and motors housed within the dual fan system. Likewise, axial dual fan system 92 extends vertically on a bottom side to lower bracket 208 where the housing of the dual fan system connects directly to the second set of isolators 212. These isolators may also comprise a rubber material while connecting directly to lower bracket 208 in a similar manner as described above for the first set of isolators 210.

Upper bracket 206 is configured to connect to both the charge-air cooler via the third set of isolators 214 (e.g., connectors) and to axial dual fan system 92 from a top side via first set of isolators 210. As described in greater detail below, the system according to the present disclosure has been optimized for inclusion in a vehicle engine compartment with a constrained space available. Thus, upper bracket 206 may have a shorter lever but also be configured with increased attachments for supporting the engine components. As one example, FIG. 2 shows upper bracket 206 with tab features 240 extending laterally from a periphery of the upper bracket that host the first set of isolators 210 and the housing of axial dual fan system 92. With this arrangement, either one or the other or both of CAC 202 and axial dual fan system 92 may be disconnected from the vehicle, e.g., during servicing, to increase the accessibility of the engine components.

With respect to the structural features of axial dual fan system 92, FIG. 3 shows a back view of the dual fan system while FIG. 4 shows a view from the front.

The fan assembly includes a perforated housing with holes 302 that allow airflow therethrough, wherein the dual fan system is not coupled directly to the vehicle body and is not directly coupled to end tanks of the charge air cooler, and where the fan system is coupled only to the upper and lower brackets. However, the perforated housing has a scaffolding design with structural ribs 310 to provide additional support that increases the rigidity of the housing while accommodating dual fans, e.g., having an asymmetric blade arrangement as shown. For simplicity, the fans are configured for synchronous operation at a single speed, for example, responsive to an engine load above a threshold. However, this is non-limiting and other operational methods are possible. As another example, the speed of the fans may be progressively increased based on the extent of the engine load above the threshold. An open shroud arrangement is advantageous because it allows an increased airflow to enhance vehicle performance, for instance, by increasing airflow at low vehicle speeds and high engine load conditions (e.g., desert off-road conditions) to extend the operating range of the vehicle. In this way, the axial dual fan assembly can be implemented within a vehicle like an off-road vehicle, an agricultural truck, and/or a towing enabled truck that may benefit from extra performance at idle or stop-start conditions.

The exemplary embodiment of FIG. 3 shows perforated housing 222 in greater detail. In particular, the housing extends to the upper bracket from a top side, and extends to the lower bracket from a bottom side with no connections extending from a lateral side to the upper and lower brackets. As described in greater detail below, the upper bracket is shaped differently than the lower bracket. Materials allowing for an injection molding process during manufacturing are attractive since injection molding serves to increase assembly ergonomics and thereby enhances the manufacturing assembly process.

For example, injection mold processing allows perforated housing 222 to be further designed with different regions for minimizing air restrictions while optimizing a structural rigidity. As one example, the exemplary embodiment includes rectangular frame 320 that is configured to accommodate dual fans in circular rings 322. Structural ribs 310 within rectangular frame 320 radially extend between circular rings 322 that conform to the shape of the fans to the perimeter that is rectangular frame 320. Although radial extensions are described, in some instances, the structured rib may extend obliquely from circular ring 322. However, in some instances, structured ribs may extend perpendicularly from the surface at a normal angle. Additional structural rigidity is attained by connecting circular rings 322 to one another by crossed-rib supports 330. Perforated housing 222 further includes upper connectors 324 that is a ribbed network extending on the top side from the rectangular scaffolding to the upper bracket (not shown). Hatched ribs 312 in this region may serve to dissipate residual vibrational energy that reaches the housing even though rubber isolators, e.g., isolators 210, are included for isolating the axial dual fan assembly from the vehicle body. Upper connectors 324 direct vibrational energy transferred to the housing substantially away from the fans and/or motors. Thus, the structural rigidity of housing 222 is further increased by reinforcing the housing with another structural region. In this way, the composite structure with different regions resists out-of-plane torsional wobbling, in addition to other motions that may act to place strain on the housing during vehicle operations, particularly in response to vibrations due to off-road usage where a vehicle may navigate a treacherous terrain. The housing provides for an open shroud with a fan inserted therein, however, an open shroud with as few airflow barriers as possible is desirable to allow for increased airflow.

Dual fans may have an increased mass depending on how the vehicle is used during operation. For example, a vehicle that tows other vehicles may operate under a high load while transporting heavy objects, which may benefit from increased cooling from larger fans and/or a higher rotational fan speed. For this reason, circular rings 322 also include load bearing ribs 340 to reinforce the housing while bearing the weight of the fans placed therein. Likewise, load bearing rings 342 are also designed to support the mass of a fan while increasing the structural stability of the housing. As one example, a compact fan motor (e.g., a two pole motor) may be implemented into the fan system due to packaging constraints. The compact fan motor allows for the use of larger blades (e.g., 200 mm radial length or greater) to increase air performance.

Another advantage of the system designed according to the present disclosure is that reinforced charge-air cooler fans may resist a water submersion (e.g., complete submersion of the fan system into water). For example, some pick-up trucks and off-road vehicles may wade into deep ponds (e.g., to a depth of 30 inches or greater). The fan system, and thereby, the fans themselves may thus become submerged in water during vehicle use. The components described may thus be made from materials that allow such a water submersion. Additionally and/or alternatively, the fans may also be exposed to high operating temperatures (e.g., greater than 100° C.) in a dry environment (referred to as desert off-road conditions) during use. The system according to the present disclosure may advantageously allow for additional cooling responsive to a temperature above a threshold to enable enhanced usage under such conditions.

FIG. 4 shows a front view of the axial dual fan system to illustrate advantageous design features. Horizontal axis 402 extends through the center of each fan such that the fans and assembly align with a horizontal axis bisecting the charge-air cooler. In other words, the two components are aligned axially, which further optimizes airflow performance. Moreover, with this alignment, the perforated housing increases the airflow by allowing extra airflow through the housing to enhance engine performance, particularly at low speeds and/or high loads. However, the housing is also formed with perforations in a scaffolding arrangement to allow the airflow while increasing a structural rigidity of the housing. In addition, vertical axis 404 illustrates a symmetry axis that increases the simplicity of sequence assembly, for example, by reducing a design and manufacturing burden (e.g., by reducing a program budget) to simplify the design process. Although FIG. 4 shows symmetrically arranged blades, in some instances, an asymmetric blade arrangement may be implemented within the axial dual fan system.

FIG. 5 shows an example fan having an asymmetric blade arrangement. For example, the blades may be configured having at least two blade spacings to increase pressure and airflow relative to a fan having a symmetric blade arrangement. The advantage of asymmetrically arranged blades is that the sound pressure may be reduced to reduce a sound level due to fan operation during use. With this arrangement, resonant frequencies that amplify sound during operation may be prevented. For simplicity, FIG. 5 shows examples first spacing 410A and second spacing 410B. Although two example blade spacings are shown, spacing may be a controllable parameter that is optimized according to an anticipated vehicle use and/or system airflow and sound quality. In this way, one or more spacings may be adjusted to achieve optimal sound qualities based on a vehicle usage. As one example, a single blade spacing may be different than the other blade spacings present. As another example, the spacing between each blade within the fan may be adjusted differently to control a pressure in the engine system. In this way, dimensional variations and spacing strategies are also conceived of. For example, if seven blade spacings are present in a particular fan, an alternating a 1-2-1-2 . . . arrangement may be used, or a sequentially increasing 1-2-3-4 . . . arrangement may also be implemented. Of course, many combinations and arrangements thereof are possible, and fall within the scope of the present disclosure.

Turning to a description of the mounting components, FIGS. 6-8B show brackets and isolators used to couple the axial dual fan system to the vehicle body while also isolating the system vibrational energy transferred thereto via the upper and lower brackets. As noted already, the upper and lower brackets connect to both the charge-air cooler and the axial dual fan system. In this way, the engine components are coupled to the vehicle body via the brackets. Although various design features of the dual fan system are shown in FIGS. 6-8B, the upper and lower brackets connect directly to rubber isolators with no parts intervening therebetween. Likewise, the rubber isolators further connect to the housing of the axial fan system directly with no parts intervening therebetween. The upper and lower brackets allow the engine components to have the arrangement relative to the vehicle system described in detail above. That is, the axial dual fan system connects to the upper and lower brackets via one or more isolators such that the position of the axial dual fan system is maintained adjacent and parallel to the charge-air cooler. Such an arrangement allows for an optimal airflow. The system further comprises a housing with a dual fan arrangement that extends to the upper bracket only from a top side, and to the lower bracket only from a bottom side.

Figure 6:
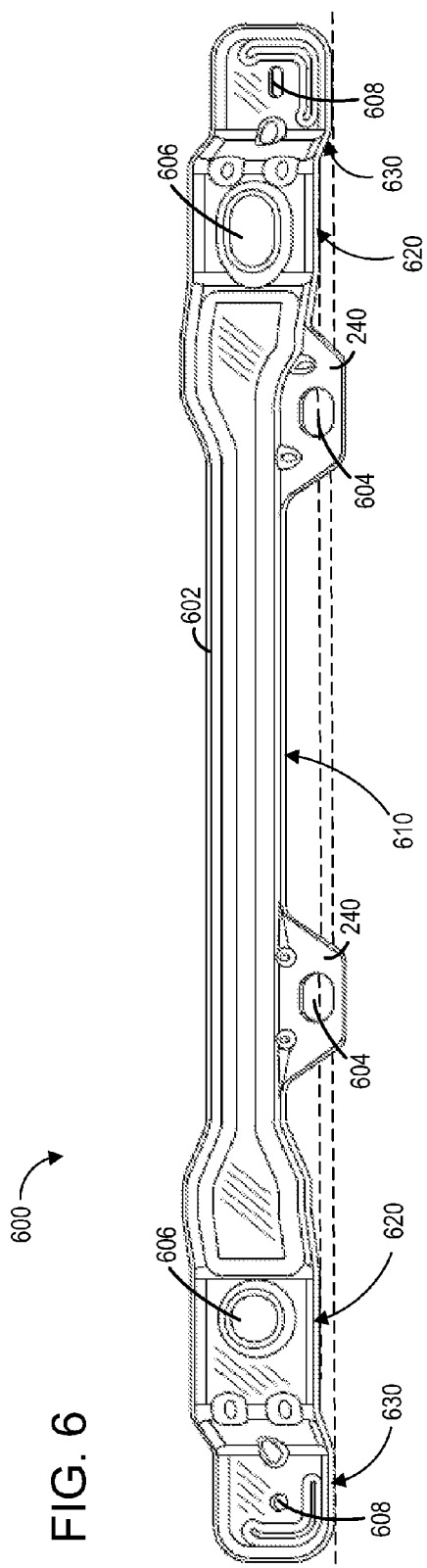
FIG. 6 provides a detailed illustration of the example upper bracket for mounting the fan assembly to a frame from a top side.
Figure 7:
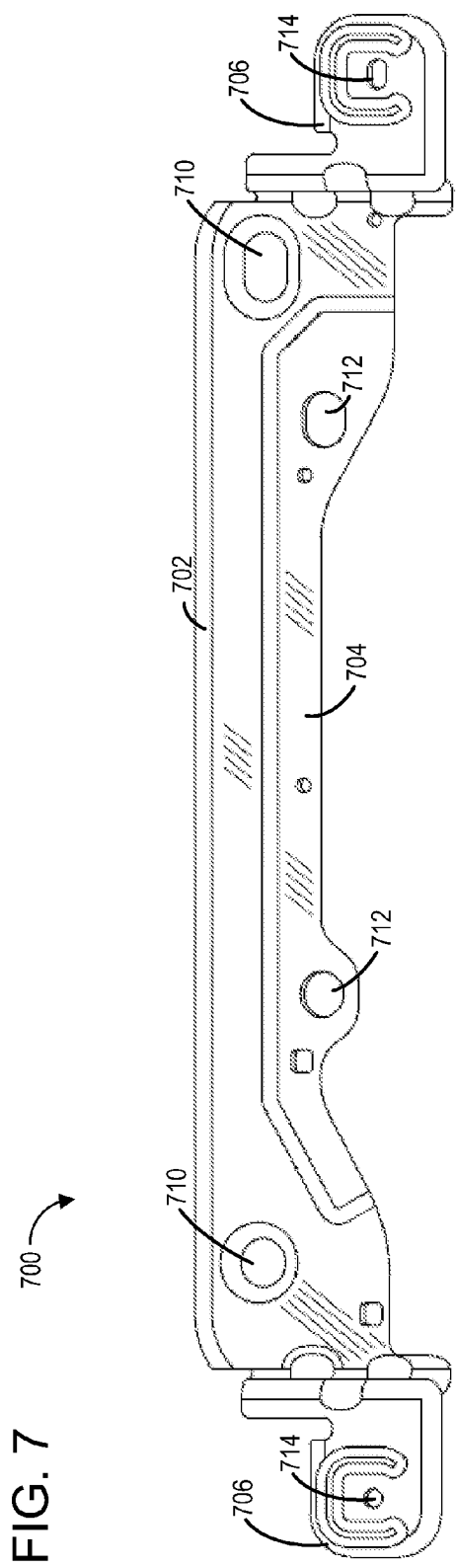
FIG. 7 provides a detailed illustration of the example lower bracket for mounting the fan assembly to a frame from the bottom side.

FIG. 6 provides a detailed illustration of an example upper bracket for mounting the fan assembly to a frame from a top side of the frame assembly, whereas FIG. 7 provides a detailed illustration of an example lower bracket for mounting the fan assembly to a frame from the bottom side of the frame assembly. Each bracket includes multiple sets of holes for coupling the upper and lower brackets to the charge-air cooler and axial dual fan system, as well as the vehicle body. Due to space constraints within the engine compartment, the upper and lower brackets may be configured differently as shown herein. However, this is non-limiting, and in other embodiments, the upper and lower brackets may have a similar contour and/or shape. As described herein, the axial dual fan system comprises a perforated housing to allow airflow therethrough, wherein the dual fan system is not coupled directly to the vehicle body and is not directly coupled to end tanks of the charge air cooler, and where the fan system is coupled only to the upper and lower brackets.

FIG. 6 shows upper bracket 600. Various annular holes are included that may be sized according to the engine components to be connected thereto. Bracket holes are thus configured to receive insertions projecting outward from the engine components. For example, FIG. 2 shows tab features 240 that project out from a side of bracket stem 602 for connecting to the axial dual fan system. FIG. 6 shows that bracket stem 602 resides on first tier 610 that separates the upper bracket from a top side of the engine components. The advantage of such an arrangement is that the upper bracket may also serve as a handle for temporarily carrying and/or inserting the system into the engine compartment as a unit. Therefore, the system according to the present disclosure may also be configured as a vehicle cooling unit that is removably inserted into the engine during vehicle assembly and/or maintenance. In this way, the bracket may also conveniently serve as a handle for supporting the weight of the cooling unit. Tab features 240 may further include fan assembly holes 604 for receiving rubber isolators connected to the axial dual fan assembly. According to the present description, the tabs may be sized such that a rigid connection is established to support the weight of the fan assembly inserted therein, while the annular holes may also be sized similarly. Cooling unit holes 606 are included for coupling charge-air cooler 202 to the upper bracket. As shown in the perspective view of FIG. 6, cooling unit holes 606 are placed within a second tier of the upper bracket indicated by 620. Due to packaging constraints of the engine, the tiered brackets allow for a close arrangement of the axial dual fan system to the charge-air cooler (e.g., less than 3 inches) to further increase airflow and increase the efficiency of cooling during operation. Body connector holes 608 are included on a third tier 630 to receive connecters that fasten the upper bracket and engine components to a vehicle body. Although not described herein, connectors may be used to attach the cooling unit to the vehicle body. As one example, screws and/or bolts may be used for the attachment. Alternatively, as another example, one or more isolators may also be used to connect the cooling unit to the vehicle body to further isolate the transfer of vibrations transferred thereto. Specific angles and spacing of the tiers relative to one another are further conceived of; however, a single example arrangement is shown for simplicity. Angular and spacing parameters may be adjusted based on constraints of a particular engine system and/or the space available within the engine compartment.

FIG. 7 provides a detailed illustration of example lower bracket 700 for mounting the fan assembly to a frame from the bottom side of the frame assembly. Although the lower bracket may be similar to the upper bracket in some embodiments, FIG. 7 shows an example wherein the lower bracket is different. In the engine compartments, the components are suspended from the upper bracket whereas they rest upon the lower bracket. For this reason, the lower brackets may be reinforced compared to the upper bracket to accommodate the force transferred thereto from the mass or weight of the engine components. Lower bracket 700 also comprises three regions for removably coupling to engine components as was described above, but has a different arrangement compared to the upper bracket. First region 702 includes cooler unit holes 710 for receiving rubber isolators associated with the charge-air cooler. Then, second region 704 includes a single tab feature instead of the individual tab features included within the upper bracket. A single tab feature, such as second region 704, allows for increased distribution of the fan assembly weight over the area of the second region and lower bracket. When configured with this arrangement, the sound quality can be further reduced since vibrations transferred to the lower bracket are efficiently dissipated. Fan assembly holes are shown at 712. Third region 706 includes body connector holes 712 for mounting the lower bracket to the vehicle body in a similar manner as described above for the upper bracket.

Figure 8A:
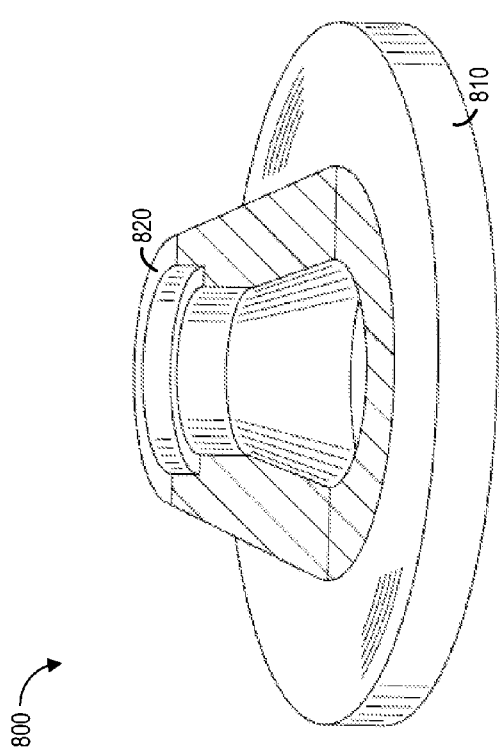
FIGS. 8A and B depict an example rubber isolator and cross-section thereof, respectively, for attaching the top bracket to an assembly housing.

FIGS. 8A and B depict an example rubber isolator for attaching the top bracket to a vehicle frame from the top side. In some instances, one or more of the isolators described may be used to couple the axial dual fan system to the top bracket whereas a different set of isolators are used to couple the fan system to the bottom bracket. Said differently, the upper bracket may be connected to the axial dual fan system via a first set of isolators that are different from a second set of isolators used to connect the lower bracket to the axial dual fan system, where a housing of the fan system attaches to the upper bracket via the first set of isolators and the housing attaches to the lower bracket via second set of isolators. In some embodiments, the lower rubber isolators referred to as the second set of isolators may be an off the shelf isolator.

Figure 8B:
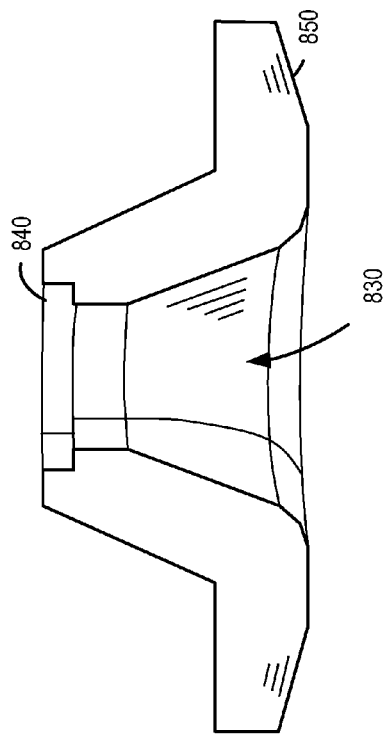

Briefly, isolator 800 includes isolator base 810 configured to provide a cushion between upper bracket 206 and housing 222 when placed in the engine. Insertion region 820 is also included for inserting into upper bracket 206. The shape of the isolator may be optimized based on the bracket and fan assembly housing to be coupled via the rubber isolator. As displayed, this part has a sloped cylindrical contour for ease of insertion during manufacturing since the upper bracket may be placed thereupon during the assembly sequence. FIG. 8B depicts a cross-section of isolator 800. Receiving region 830 is a hollow cavity that sits upon, e.g., housing 222 of FIG. 2. In this way, receiving region 830 receives the complementary fitting from the housing to connect the engine components. Snap-tite fitting 840 is an annular cylindrical cavity having a slightly larger size than the rest of the cavity that receives the assembly housing. The fitting is placed at an top region of isolator 800 to secure connection of isolator 800 to housing 222 when the two components are connected. As one example, the housing may be inserted into the receiving region 830 until resistance is felt. Thereafter, additional force may be used to expand the rubber isolator using the housing as the housing connector pushes thru receiving region 830. Once the topmost region is engaged, the housing connector snaps into place while the size of the temporarily expanded rubber retracts to securely fit around the housing connector, which provides the secure connection between the two pieces. Angled groove 850 further reduces the surface area of the connection between the isolator and the housing, and thus reduces the amount of energy transferred to the housing from upper bracket 206 via isolator 800.

Figure 9:
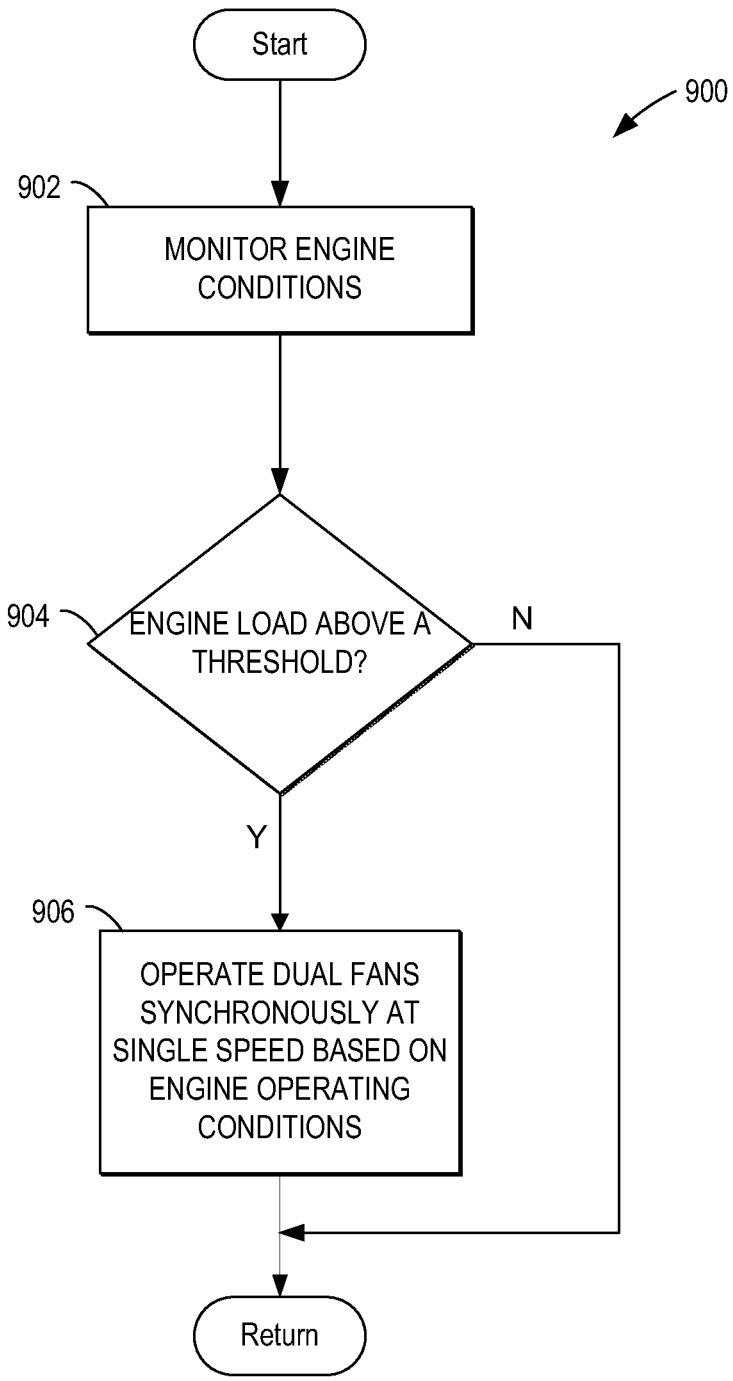
FIG. 9 illustrates an example flow chart for operating the dual fans according to the present disclosure.

FIG. 9 illustrates example method 900 for operating the dual fans according to the present disclosure. For simplicity of description, each fan of the dual fan system is engaged for operation at a single speed responsive to a temperature above a threshold (e.g., greater 100° C.). A controller may thus include instructions for operating the dual fans synchronously at the single speed responsive to an engine load above a threshold. Said differently, when one or more engine conditions indicate an engine load above a threshold, the controller may engage both fans simultaneously to control the amount of air that flows across the charge-air cooler. The dual fans may harmoniously rotate or run at substantially identical angular velocities to achieve the cooling effect desired. Although the fans are herein described with respect to synchronous operation at a single speed, other operational control methods are also possible. As one example, in another instance, the rotational speed of the fans may be progressively increased based on the extent of the engine load above the threshold. In this way, a larger extent of cooling may be achieved for higher engine loads whereas a smaller extent of cooling may occur for lower loads that just exceed the threshold. For example, by increasing the electric fan rotation speed, the amount and rate of air flow to the engine increases. Conversely, by decreasing the fan rotation speed, the rate of air flow decreases. Alternatively, as another example, the two or more electric fans may be controlled separately (e.g., at different rotational speeds) to provide differential cooling within the engine system. In yet another example, the electric fans may be turned on at a low rotation speed to decrease CAC efficiency and increase CAC outlet temperature. Specifically, at low speeds, the electric fan may not be effective in cooling. However, the blades of the fan may act to resist airflow to the radiator and CAC. In this way, ambient air flow velocities directly affect CAC effectiveness and CAC outlet temperature. Thus, by changing fan rotation speed, CAC efficiency and outlet temperature may be altered. In addition to controlling rotation speed, the electric fan may also change rotation direction to alter the cooling air flow reaching engine components and, subsequently, CAC efficiency and outlet temperature.

Method 900 includes monitoring one or more engine conditions at 902 to determine whether the engine load exceeds a threshold. For example, control system 28 may monitor a temperature and/or rotational speed within the engine to determine the load on the engine. Then, at 904, the load determined may be compared to a threshold selected to indicate a point at which additional engine cooling may increase the operational efficiency of the charge-air cooler and/or engine. If an engine load exceeds the threshold, at 906, controller 12 may engage the dual fan system by operating both fans at a single speed responsive to the engine load above the threshold. Otherwise, if an engine load falls below the threshold, method 900 may continue to monitor the engine conditions while operation of the vehicle is continued.

In this way, the system according to the present description allows for simplification of an assembly sequence during vehicle manufacturing while allowing for increased airflow in the engine compartment. An axial dual fan system that extends vertically to the upper brackets on a top side, and extends vertically to the lower brackets on a bottom side further allows for packaging within the engine compartment to be accommodated when space constraints are otherwise present. As described in detail above, brackets configured to connect to both a heat exchanger, e.g., a charge-air cooler, and to the fan assembly also allow for a noise reduction within the engine system by allowing for vibrations to be reduced therein. Isolators provide for increased stiffness to further reduce the vibrations transferred to the engine components during operation.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first"

element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a charge-air cooler coupled via an upper bracket and a lower bracket to a vehicle body, the charge-air cooler including an inlet fluidically coupled to a compressor and an outlet fluidically coupled to an intake manifold of an engine; and
   an axial dual fan system connected to the upper and lower brackets via one or more isolators, the axial dual fan system comprising a perforated housing including a rectangular frame, a first upper connector, and a second upper connector, each upper connector extending from the rectangular frame to the upper bracket and including a plurality of hatched ribs.

2. The system of claim 1, wherein the axial dual fan system extends vertically to the upper bracket on a top side, and extends vertically to the lower bracket on a bottom side, and wherein the perforated housing further includes a first circular ring, a second circular ring, and a plurality of structural ribs each extending between a respective circular ring and the rectangular frame, the first circular ring accommodating a first fan of the axial dual fan system and the second circular ring accommodating a second fan of the axial dual fan system.

3. The system of claim 2, wherein the dual fan system is not coupled directly to the vehicle body and is not directly coupled to end tanks of the charge air cooler, and where the axial dual fan system is coupled only to the upper and lower brackets.

4. The system of claim 3, wherein the charge-air cooler and the axial dual fan system are arranged with a parallel alignment, the axial dual fan system positioned directly adjacent to the charge-air cooler without any intervening components therebetween, and wherein the perforated housing further comprises one or more crossed-rib supports coupled between the first circular ring and the second circular ring.

5. The system of claim 4, wherein a width of the axial dual fan system in a lateral direction is smaller than a width of the charge-air cooler.

6. The system of claim 5, wherein an axis extending through a center of each fan aligns with a horizontal axis bisecting the charge-air cooler.

7. The system of claim 6, wherein each fan of the axial dual fan system has an asymmetric blade arrangement.

8. The system of claim 7, wherein the asymmetric blade arrangement further includes fan blades with two or more blade spacings.

9. The system of claim 8, wherein the axial dual fan system is configured to operate each fan at the same speed.

10. The system of claim 2, wherein the one or more isolators comprise a rubber material, a first set of isolators connecting the axial dual fan system to the upper bracket and a second set of isolators connecting the axial dual fan system to the lower bracket, where the perforated housing attaches to the upper bracket via the first set of isolators and the perforated housing attaches to the lower bracket via the second set of isolators, wherein each isolator of the first set of isolators comprises an annular base coupled to a hollow sloped cylinder, the hollow sloped cylinder shaped to receive a complementary fitting on the perforated housing, the annular base including a first bottom surface extending from the hollow sloped cylinder and a second bottom surface extending from the first bottom surface, the second bottom surface angled with respect to the first bottom surface.

11. An engine configured to increase an airflow through a heat exchanger, comprising:
    a heat exchanger coupled to a vehicle body via an upper bracket and a lower bracket;
    an axial dual fan system connected to the upper and lower brackets via one or more rubber isolators and arranged directly adjacent to the heat exchanger, the upper bracket coupled to the axial dual fan system on a first plane of the upper bracket, coupled to the heat exchanger on a second plane of the upper bracket, and coupled to the vehicle body on a third plane of the upper bracket, the lower bracket coupled to the axial dual fan system and the heat exchanger on a first plane of the lower bracket and coupled to the vehicle body on a second plane of the lower bracket.

12. The engine of claim 11, wherein the one or more rubber isolators connect the axial dual fan system to the upper and lower brackets with no parts intervening therebetween, wherein the upper bracket includes a first tab and a second tab each extending from a bracket stem of the upper bracket, the first tab and second tab each including a respective fan assembly hole for receiving a rubber isolator of the one or more rubber isolators, and wherein the lower bracket includes a third tab extending from a bracket stem of the lower bracket, the third tab including two fan assembly holes for receiving respective rubber isolators of the one or more rubber isolators.

13. The engine of claim 12, wherein the heat exchanger is a charge-air cooler, wherein the first plane of the upper bracket is parallel to the second plane of the upper bracket, and the third plane of the upper bracket is parallel to the first plane and the second plane of the upper bracket, and wherein the first plane of the lower bracket is parallel to the second plane of the lower bracket.

14. The engine of claim 11, wherein the axial dual fan system includes a perforated housing.

15. The engine of claim 14, wherein the perforated housing is shaped to accommodate dual fans, wherein the dual fans comprise asymmetric blades having at least two blade spacings.

16. The engine of claim 15, wherein the dual fans synchronously operate at a single speed.

17. The engine of claim 16, further comprising a controller including instructions to operate the dual fans synchronously at the single speed responsive to an engine load above a threshold.

18. A cooling unit for a vehicle, comprising:
    a charge-air cooler,
    upper and lower brackets for coupling the charge-air cooler to a vehicle body via the upper and lower brackets; and
    a dual fan system connecting to only the upper and lower brackets via one or more isolators and arranged adjacent to the charge-air cooler, wherein the dual fan system comprises a housing that extends to the upper bracket and to the lower bracket, the housing including perforations, the one or more isolators comprising a first isolator including an annular base coupled to a hollow sloped cylinder, the hollow sloped cylinder shaped to receive a complementary fitting on the housing of the dual fan system, the annular base including a first bottom surface extending from the hollow sloped cylinder and a second bottom surface extending from the first bottom surface, the second bottom surface angled with respect to the first bottom surface.

19. The cooling unit of claim 18, wherein the one or more isolators comprise a rubber material to reduce a vibrational energy transferred to the dual fan system via the upper and lower brackets.

20. The cooling unit of claim 19, wherein a lateral width of the charge-air cooler is greater than a lateral width of the dual fan system housing and an end portion of the charge-air cooler comprising a tubular projection extends laterally beyond the housing, the end portion not being coupled to the housing.

* * * * *